Figure 1:
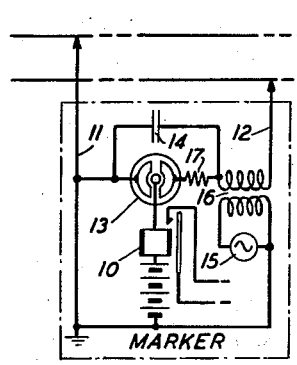

Nov. 28, 1939.    F. E. BLOUNT    2,181,560
ELECTRICAL TESTING SYSTEM
Filed July 1, 1937

NEGATIVE RESISTANCE

INVENTOR
F. E. BLOUNT
BY
ATTORNEY

Patented Nov. 28, 1939

2,181,560

UNITED STATES PATENT OFFICE 2,181,560

ELECTRICAL TESTING SYSTEM

Frank E. Blount, Cedar Grove, N. J., assignor to Bell Telephone Laboratories, Incorporated, New York, N. Y., a corporation of New York Application July 1, 1937, Serial No. 151,406

19 Claims. (Cl. 179—175.2)

This invention relates to testing devices and particularly to means for testing the continuity of electrical connections.

It is the object of the invention to provide a reliable arrangement for testing the continuity of an electrical connection, the closed circuit impedance of which may be non-linear in character.

This invention is a circuit testing device comprising a source of alternating current, a test relay and a gas-filled tube, the control element of the tube being so connected to the circuit path under test that the test relay is operated only if the circuit path is continuous.

A feature of the invention is a circuit testing device comprising a source of alternating current, a test relay and a gas-filled tube, the control element of the tube being so connected to the circuit path under test that the test relay is operated only if the circuit path is continuous, and moreover without operatively affecting any electrical apparatus included in the circuit.

Another feature of the invention is a circuit testing device comprising a source of alternating current, a test relay and a gas-filled tube for testing the continuity of a connection, the closed circuit impedance of which is non-linear in character, the control element of the tube being so connected to the circuit path under test that the test relay is operated only when the path is continuous.

A further feature of the invention is a circuit testing device comprising a source of alternating current, a test relay and a gas-filled tube for testing the continuity of a circuit path which includes a circuit element offering a high impedance to impressed differences in potential below a critical value and a very much reduced impedance to impressed differences in potential equal to or greater than this critical value.

A clear and complete understanding of the invention will be facilitated by the consideration of testing devices arranged in accordance with the invention, four such arrangements being shown schematically in the drawing which forms a part of this specification. The invention is not limited in its application to the specific arrangements shown but is generally applicable to all circuit arrangements used for testing electrical circuit paths.

Referring to the drawing, each of Figs. 1, 2, 3 and 4 shows a portion of an automatic telephone system comprising a marker, an intermediate selector IS, a final selector FS, a subscriber's line L, and in the marker a testing device comprising a test relay and a gas-filled tube.

Figure 5:
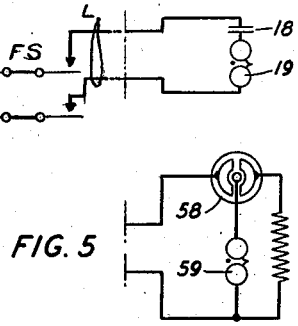
Figure 6:
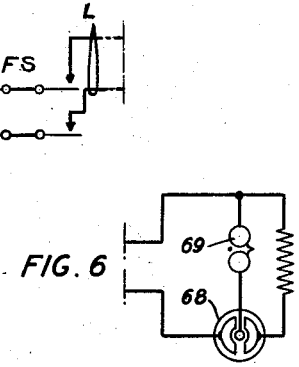
Figure 7:
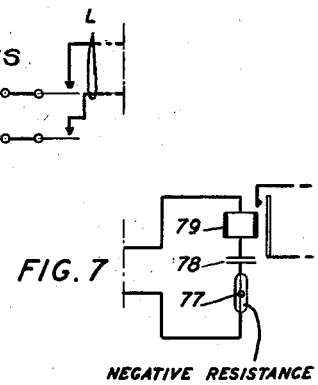

Fig. 1 also shows the ringer and ringing condenser normally bridged across the conductors of a line serving a single subscriber; and Figs. 5, 6 and 7 show alternative arrangements of ringing apparatus normally bridged across the conductors at the stations of a multi-party line.

The subscriber's station connected to line L is represented in Fig. 1 by the ringer and ringing condenser which are normally bridged across a line which serves a single subscriber, the other station apparatus being omitted. The selector switches IS and FS may be of any known type arranged for marker control. Reference may be had to the patents of W. W. Carpenter, No. 2,093,117 dated September 14, 1937 and No. 2,089,921 dated August 10, 1937 for a complete description of an automatic telephone system comprising marker controlled switches for establishing connections with called lines. The marker is represented by the broken line enclosure within which is shown a testing device arranged in accordance with this invention.

Assuming an incoming selector IS and a final selector FS to have been operated under the control of an associated marker to connect with a called line L, the continuity of the circuit path through switches IS and FS to the line L is tested by connecting the testing apparatus to the conductors of switch IS.

Upon connection of the testing apparatus shown in Fig. 1 through conductors 11 and 12 to the conductors of switch IS, and assuming the connection through switches IS and FS and over line L to the subscriber's station to be continuous there is a circuit from ground, through conductor 11, upper contacts of switches IS and FS, over line L, through the ringing condenser 18 and ringer 19 at the subscriber's station, lower contacts of switches FS and IS, conductor 12, upper winding of transformer 16, and through condenser 14 to ground. The lower winding of transformer 16 is connected to a source of alternating current 15 to produce a current in the above traced test circuit. This current is not strong enough to operate the ringer but the resulting drop in potential across condenser 14 is sufficient to cause breakdown between the control electrodes and ionization of the gas in the three-element cold cathode gas-filled tube 13. Upon ionization of tube 13, test relay 10 is energized by the current in the anode-cathode circuit; and the operation of relay 10 closes a circuit which frees the marker for use on other connections. The resistor 17 limits the current over the line after breakdown of the tube. If, however, the connection to and through line L is not continuous, the impedance of the test circuit is very much higher, its value being dependent upon the capacity between the conductors up to the open point and the capacity of each of these conductors to ground; and the current in the test circuit produces a drop in potential across condenser 14 which is insufficient to cause breakdown between the control electrodes of tube 13. Since in this case relay 10 does not operate, the switches IS and FS are released and the marker operates further to establish a connection with the called line L through another one of the available switch paths. The transformer ratio and size of condenser 14 are such as to cause operation of the tube and test relay when a connection and line of maximum closed circuit impedance is being tested and prevent operation of the tube and relay when the open circuit impedance is a minimum.

If the line being tested is a party line, the signaling bridge at each subscriber's station may consist of the ringing condenser and a relay, each relay being effective when operated to connect an associated ringer to the one or the other of the line conductors. When testing such a line, these relays do not respond to the test current and the test proceeds as above described. If the line being tested is a party line, the signaling bridge at each station may comprise a gas-filled tube or other circuit element having a non-linear impedance characteristic. The signaling bridge shown in Fig. 5 comprises a three-element cold cathode gas-filled tube 58 which breaks down upon closure of the test circuit over conductors 11 and 12 of the marker in Fig. 1; and the current in the test circuit charges condenser 14 to cause breakdown of tube 13 and operation of test relay 10; but this current is insufficient to operate the ringer 59. The signaling bridge shown in Fig. 6 is similar to that of Fig. 5 except that it is reversed with respect to the conductors of the line L. The signaling bridge shown in Fig. 7 comprises a boron element 77 in series with a condenser 78 and a relay 79 which relay when operated connects a ringer to the one or the other of the conductors of the line. When the test circuit is closed over conductors 11 and 12 of the marker in Fig. 1, the impedance of the boron element 77 is reduced sufficiently to cause operation of the tube 13 and relay 10 without permitting operation of the relay 79.

Figure 2:
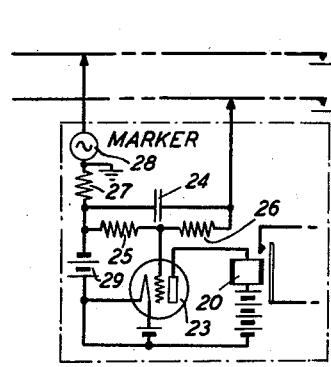

The testing apparatus shown in the marker of Fig. 2 comprises a test relay 20, a three-element hot cathode gas-filled tube 23, a condenser 24, resistors 25, 26 and 27 and a source of alternating current 28. Tube 23 is normally biased by a battery 29 connected between the cathode and grid to prevent the operation of relay 20. The condenser 24 and resistors 25 and 26 form an impedance network connected in series with the source 28 and the circuit path under test, the junction point between resistors 25 and 26 being connected to the grid of tube 23. If the connection to the called line is continuous, part of the drop in potential across condenser 24 (that is, the drop in potential through resistor 25) is impressed on the grid and overcomes the negative bias to initiate current between the anode and cathode and thereby cause the operation of test relay 20. The condenser 24 is of such a capacity and the resistors 25, 26 and 27 of such resistances that relay 20 is not operated when the minimum open-circuit impedance is encountered but is operated when the maximum closed-circuit impedance is encountered. This testing apparatus will operate satisfactorily when testing any of the line conditions represented in Figs. 1, 5, 6 or 7, the ringer or ringing relay at each station being non-responsive to the test current.

Figure 3:
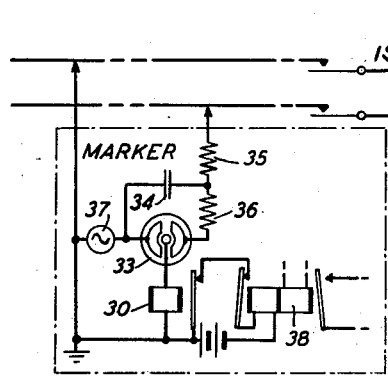

The testing apparatus shown in the marker of Fig. 3 comprises a test relay 30, a three-element cold cathode gas-filled tube 33, a condenser 34, resistors 35 and 36, a source of alternating current 37 and an auxiliary relay 38. Relay 38 is operated in a circuit, not shown, prior to the closure of the testing circuit and is held operated under control of test relay 30. Upon connection of the source 37, condenser 34 and resistor 35 in series to the conductors of a switch IS, the drop in potential through condenser 34 is sufficient if the connection to the called line is continuous to cause breakdown between the control electrodes of tube 33; and the resulting ionization of the gas initiates current between the anode and cathode to operate relay 30. The operation of relay 30 causes the release of relay 38, allowing the marker to be disconnected. The resistor 35 and condenser 34 are of such a character as to prevent operation of relay 30 when the minimum open-circuit impedance is encountered and to cause operation of relay 30 when the maximum closed-circuit impedance is encountered. The resistor 36 limits the current over the line after breakdown of the tube. This testing apparatus will operate satisfactorily when testing any of the line conditions represented in Figs. 1, 5, 6 or 7, the ringer or ringing relay at each station being non-responsive to the test current.

Figure 4:
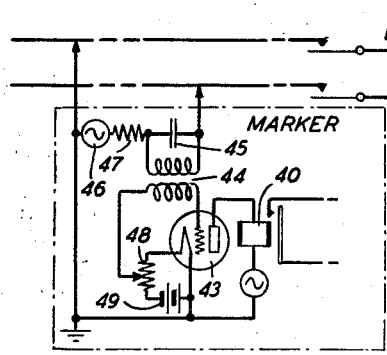

The testing apparatus shown in the marker of Fig. 4 comprises a test relay 40, three-element hot cathode gas-filled tube 43, a transformer 44, condenser 45, source of alternating current 46 and resistor 47. Tube 43 is normally biased by a battery 49 and potentiometer 48 to prevent operation of relay 40. Upon connection of source 46, resistor 47, and condenser 45 in parallel with the upper winding of transformer 44, in series to the conductors of a switch IS, the drop in potential across condenser 45 is impressed across the upper winding of transformer 44 and induces a difference in potential across the lower winding of this transformer. If the connection to the called line is continuous, the difference in potential across condenser 45 is sufficient to overcome the normal bias of tube 43 and initiate current between the anode and cathode to operate test relay 40. A 60 cycle alternating current source is shown in the anode-cathode circuit but a direct current source may be used. If the connection is open at any point, relay 40 is not operated. The resistor 47, condenser 45, and transformer 44 are of such a character as to prevent operation of relay 40 when the minimum open-circuit impedance is encountered and to cause operation of relay 40 when the maximum closed-circuit impedance is encountered. This testing apparatus is adapted to test any of the line conditions represented in Figs. 1, 5, 6 or 7, the ringer or ringing relay at each station being non-responsive to the test current.

What is claimed is:

1. A testing device for testing a circuit path, said device comprising a source of alternating current, a condenser connected in series with said source and the circuit path under test, a three-element gas-filled tube of the cold electrode type, the control elements of said tube being connected to opposite terminals of said condenser, and a test relay, said relay being connected in series with the anode and one of the control elements of said tube.

2. A testing apparatus for testing the impedance of a circuit path, said apparatus comprising a source of alternating current, a condenser, a three-element gas-filled tube and a test relay, said relay being connected in series with the anode and cathode of said tube, and said condenser being connected in series with said source and the circuit path which is being tested, the grid and cathode of said tube being connected to opposite electrodes of said condenser so that the potential of the grid with respect to the cathode depends upon the difference in potential between said electrodes.

3. A testing apparatus for testing the continuity of a circuit path, said apparatus comprising a source of alternating current and a condenser connected in series with the path undergoing test, a three-element gas-filled tube, the control elements of said tube being connected to the opposing electrodes of said condenser, a source of current for the anode of said tube, and a relay connected in series with the anode and its current source and in series with one of the control elements of said tube.

4. A testing device for testing the continuity of a circuit path, said device comprising a source of alternating current, a condenser connected in series with said source and the circuit path under test, a three-element hot cathode gas-filled tube, the grid and cathode of said tube being connected to opposite terminals of said condenser so as to be electrically affected by the drop in potential through said condenser, and a test relay connected in series with the anode and cathode of said tube.

5. Apparatus for testing a circuit path, comprising a transformer, a source of alternating current connected to the primary winding of said transformer, a condenser connected in series with the secondary winding of said transformer and the circuit path which is being tested, a three-element gas-filled tube of the cold electrode type, the control elements of said tube being connected to opposite terminals of said condenser, and a test relay connected in series with the anode and one of the control elements of said tube.

6. Apparatus for testing a circuit path, comprising a source of alternating current, a condenser connected in series with said source and the circuit path under test, a three-element hot cathode gas-filled tube, the cathode and grid elements of said tube being connected to opposite terminals of said condenser, and a test relay connected in series with the anode and cathode of said tube.

7. In a combination according to claim 6, means for biasing the grid of said tube with respect to the cathode.

8. In a combination according to claim 3, an auxiliary relay, and a holding circuit for said auxiliary relay including a normally closed contact of said test relay and a normally open contact of said auxiliary relay.

9. A testing apparatus for testing a circuit path, said apparatus comprising a source of alternating current and a condenser connected in series with the circuit path under test, a three-element gas-filled tube, a transformer having one winding connected in parallel with said condenser and another winding connected between the grid and cathode of said tube, and a test relay connected in the anode-cathode circuit of said tube.

10. In a switching system, means for testing the circuit path established through a train of switches, said circuit path including series capacitance, said testing means comprising a source of alternating current and a condenser connected in series with the circuit path undergoing test, a three-element gas-filled tube, a test relay connected in series with the anode and one of the control elements of said tube, and means connecting said condenser across the control elements of said tube so that the drop in potential across said condenser is impressed on said control elements.

11. In combination a circuit path which is being tested, electrical apparatus included in said circuit path, and testing means comprising a source of alternating current, a condenser connected in series with said source and circuit path, a three-element gas-filled tube, the grid and cathode of said tube being connected to opposite terminals of said condenser, and a test relay connected in series with the anode and cathode of said tube, said condenser being effective to prevent the operation of said electrical apparatus during the test, and the drop in potential across said condenser being effective if said circuit path is continuous to initiate current in the anode-cathode circuit to operate said test relay.

12. In combination, a circuit path which is being tested, a circuit element in said circuit path, the impedance of said element being non-linear in character, and testing means adapted to test the continuity of said circuit path, said testing means comprising a source of alternating current, a condenser connected in series with said source and said circuit path, a three-element gas-filled tube, the grid and cathode of said tube being connected to opposite terminals of said condenser so that the drop in potential across said element is effective if said circuit path is continuous to initiate current between the anode and cathode, and a test relay in series with the anode and cathode.

13. In combination, a circuit path which is being tested, circuit elements including a gas-filled tube connected in series in said circuit path, and testing means for testing said circuit path, said testing means comprising a source of alternating current, a condenser connected in series with said source and said circuit path, a three-element gas-filled tube, means connecting said condenser across the control elements of said three-element tube, said first-mentioned gas-filled tube becoming a conductor upon connection of said source to said circuit path if said circuit path is continuous, the drop in potential across said condenser being thereupon increased sufficiently to cause the energization of said three-element gas-filled tube, and a test relay connected in series with the anode and one of the control elements of said three-element tube.

14. In a testing device according to claim 1, an impedance element connected in series with said control elements and said circuit path for limiting the current in said circuit path upon ionization of the gas in said tube.

15. In a testing device according to claim 3, a resistor connected in series with the control elements of said tube and said circuit path for limiting the current in said circuit path upon initiation of current through the tube.

16. In a testing device according to claim 13, a resistor connected in series with said circuit path and the control elements of the three-element tube for limiting the current in said circuit path upon said tube becoming a conductor.

17. A device for testing the continuity of a circuit path, said path including a non-linear impedance, said device comprising a three-element gas-filled tube, a source of testing potential, a capacitor, a resistor, said source and capacitor being connected in series with said circuit path, said capacitor and resistor in series being bridged across the cathode and control elements of said tube, and a relay and a source of potential connected in series with the anode and cathode elements of said tube.

18. A testing apparatus for testing the continuity of a circuit path including series capacitance, said apparatus comprising a source of alternating current and a condenser connected in series with the path undergoing test, a three-element gas-filled tube of the cold electrode type, the control elements of said tube being connected to the opposing electrodes of said condenser, a source of current, and a relay connected in series with the anode, said source and one of said control electrodes.

19. In a telephone system, subscribers' stations and lines, switches comprising movable contacts, means comprising a marker for controlling the operation of one or more of said switches to establish a connection with a desired one of said subscribers' lines, and means for testing the continuity of the connection through said switches, said testing means comprising a three-element gas-filled tube of the cold electrode type, a source of alternating current, a condenser, a test relay, means connecting said condenser and source of alternating current in series with the conductors of the switches included in said connection, the called line and subscriber's station equipment also being connected in series with said source and condenser if the connection through said switches is properly closed, means connecting said condenser across the control elements of said tube so as to impress the drop in potential through said condenser on said control elements, and a source of current connected in series with said relay and the anode of said tube and one of the control elements, the drop in potential through said condenser being large enough to cause breakdown of the tube and operation of said relay only if there is a closed circuit through said switches and the called line.

FRANK E. BLOUNT.